United States Patent
Godber

(10) Patent No.: US 10,235,641 B2
(45) Date of Patent: Mar. 19, 2019

(54) RESERVATION SYSTEM AND METHOD THEREFOR

(71) Applicant: SITA Information Networking Computing Ireland Limited, Letterkenny (IE)

(72) Inventor: Daniel Tomos Godber, Betws-y-Coed (GB)

(73) Assignee: SITA INFORMATION NETWORKING COMPUTING IRELAND LIMITED, Letterkenny (IE)

( * ) Notice: Subject to any disclaimer, the term of this patent is extended or adjusted under 35 U.S.C. 154(b) by 658 days.

(21) Appl. No.: 14/624,164

(22) Filed: Feb. 17, 2015

(65) Prior Publication Data

US 2015/0235147 A1 Aug. 20, 2015

Related U.S. Application Data

(60) Provisional application No. 61/941,736, filed on Feb. 19, 2014.

(30) Foreign Application Priority Data

Dec. 1, 2014 (GB) .................... 1421313.6

(51) Int. Cl.
*G06Q 10/02* (2012.01)
*G06F 17/22* (2006.01)
(Continued)

(52) U.S. Cl.
CPC ........... *G06Q 10/02* (2013.01); *G06F 17/227* (2013.01); *G06Q 30/06* (2013.01); *H04L 67/02* (2013.01)

(58) Field of Classification Search
CPC ...... G06Q 10/02; G06Q 30/06; G06F 17/227; H04L 67/02
(Continued)

(56) References Cited

U.S. PATENT DOCUMENTS 4,821,118 A 4/1989 Lafreniere
5,270,921 A 12/1993 Hornick
(Continued)

FOREIGN PATENT DOCUMENTS

CN 101436185 A 5/2009
DE 10357831 A1 7/2005
(Continued)

OTHER PUBLICATIONS

O.M. Olaniyi et. al., "Development of a mobile airline reservation and payment system", Int. J. Electronic Finance, 372, 389, vol. 4, No. 4, 2010 (Year: 2010).*

(Continued)

*Primary Examiner* — George Chen
*Assistant Examiner* — Emmett K. Walsh
(74) *Attorney, Agent, or Firm* — Morris, Manning & Martin, LLP; Daniel E. Sineway, Esq.; R. Lee Strasburger, Jr., Esq.

(57) ABSTRACT

A reservation system is disclosed. The system comprises a communication means for receiving, from a remote device, an availability request for a product or service; sending, to the device, a first ordered list element data representing a distribution of a plurality of different products or services within a map in response to receiving the request; and for receiving, from the remote device, a reservation request for one of the plurality of different products or services.

23 Claims, 6 Drawing Sheets

(51) Int. Cl.
*H04L 29/08* (2006.01)
*G06Q 30/06* (2012.01)

(58) Field of Classification Search
USPC .......................................................... 705/5
See application file for complete search history.

(56) References Cited

U.S. PATENT DOCUMENTS

| | | | |
|---|---|---|---|
| 5,748,850 A | 5/1998 | Sakurai | |
| 5,793,639 A | 8/1998 | Yamazaki | |
| 5,897,620 A | 4/1999 | Walker | |
| 5,918,209 A | 6/1999 | Campbell et al. | |
| 6,044,353 A | 3/2000 | Pugliese, III | |
| 6,108,636 A | 8/2000 | Yap et al. | |
| 6,112,185 A | 8/2000 | Walker et al. | |
| 6,158,658 A | 12/2000 | Barclay | |
| 6,192,416 B1 | 2/2001 | Baxter | |
| 6,259,405 B1 | 7/2001 | Stewart | |
| 6,367,016 B1 | 4/2002 | Lambert et al. | |
| 6,414,635 B1 | 7/2002 | Stewart | |
| 6,473,704 B1 | 10/2002 | Ito et al. | |
| 6,553,336 B1 | 4/2003 | Johnson | |
| 6,661,340 B1 | 12/2003 | Saylor et al. | |
| 6,695,203 B2 | 2/2004 | Iki et al. | |
| 6,735,630 B1 | 5/2004 | Gelvin | |
| 6,736,322 B2 | 5/2004 | Gobburu | |
| 6,758,394 B2 | 7/2004 | Maskatiya | |
| 6,760,778 B1 | 7/2004 | Nelson et al. | |
| 6,869,023 B2 | 3/2005 | Hawes et al. | |
| 6,972,682 B2 | 12/2005 | Lareau | |
| 6,982,729 B1 * | 1/2006 | Lange ..................... | G09G 5/14 345/3.4 |
| 7,027,808 B2 | 4/2006 | Wesby | |
| 7,035,828 B2 | 4/2006 | Ketonen et al. | |
| 7,212,978 B2 | 5/2007 | Kowal et al. | |
| 7,258,276 B2 | 8/2007 | Linton et al. | |
| 7,275,689 B2 | 10/2007 | Mak | |
| 7,327,262 B2 | 2/2008 | Motteram et al. | |
| 7,421,319 B2 | 9/2008 | Stefani | |
| 7,440,967 B2 | 10/2008 | Chidlovskii | |
| 7,454,203 B2 | 11/2008 | Levitan | |
| 7,483,696 B1 | 1/2009 | Mitchell | |
| 7,486,171 B2 | 2/2009 | Kim | |
| 7,486,960 B2 | 2/2009 | Brady, Jr. et al. | |
| 7,539,985 B2 | 5/2009 | Marvin | |
| 7,571,206 B2 | 8/2009 | Koning et al. | |
| 7,599,847 B2 | 10/2009 | Block | |
| 7,607,080 B2 | 10/2009 | Heuer et al. | |
| 7,664,672 B1 | 2/2010 | Walker et al. | |
| 7,668,873 B2 | 2/2010 | Davis et al. | |
| 7,685,009 B2 | 3/2010 | Halavais et al. | |
| 7,702,328 B2 | 4/2010 | Lemond et al. | |
| 7,720,724 B2 | 5/2010 | Kurashige | |
| 7,739,292 B2 | 6/2010 | Falk et al. | |
| 7,786,899 B2 | 8/2010 | Baker et al. | |
| 7,805,523 B2 | 9/2010 | Mitchell et al. | |
| 7,870,101 B2 | 1/2011 | Hubbard et al. | |
| 7,882,137 B2 | 2/2011 | Lepman | |
| 7,907,067 B2 | 3/2011 | Baker et al. | |
| 7,907,545 B2 | 3/2011 | Ric | |
| 7,949,335 B2 | 5/2011 | Stefani et al. | |
| 7,954,712 B2 | 6/2011 | Babcock et al. | |
| 8,001,519 B2 | 8/2011 | Conallen et al. | |
| 8,058,972 B2 | 11/2011 | Mohanty | |
| 8,087,583 B2 | 1/2012 | Hawes | |
| 8,090,603 B2 | 1/2012 | Payne et al. | |
| 8,117,051 B2 | 2/2012 | Sauvage et al. | |
| 8,160,759 B2 | 4/2012 | Baker et al. | |
| 8,165,809 B1 | 4/2012 | Baker et al. | |
| 8,170,535 B1 | 5/2012 | Lopes et al. | |
| 8,195,151 B2 | 6/2012 | Cerra, II et al. | |
| 8,214,144 B2 | 7/2012 | Baker et al. | |
| 8,229,458 B2 | 7/2012 | Busch | |
| 8,296,281 B2 | 10/2012 | Baker et al. | |
| 8,332,136 B2 | 12/2012 | Baker et al. | |
| 8,467,726 B2 | 6/2013 | Shirakata | |
| 8,509,441 B2 | 8/2013 | Yoon | |
| 8,521,681 B2 | 8/2013 | Ouchi | |
| 8,606,508 B2 | 12/2013 | Baker et al. | |
| 8,631,358 B2 | 1/2014 | Louch | |
| 8,665,238 B1 | 3/2014 | Gossweiler, III | |
| 8,671,009 B1 | 3/2014 | Coley et al. | |
| 8,713,661 B2 | 4/2014 | Vysogorets et al. | |
| 8,949,142 B1 | 2/2015 | Angrish | |
| 8,977,568 B1 | 3/2015 | Schattauer | |
| 9,024,752 B2 | 5/2015 | Tumayan | |
| 9,026,461 B2 | 5/2015 | Calman | |
| 9,047,512 B2 | 6/2015 | Otis | |
| 9,134,955 B2 | 9/2015 | Healey | |
| 9,141,325 B2 | 9/2015 | Dersy | |
| 9,239,246 B2 | 1/2016 | Jones | |
| 9,275,550 B1 | 3/2016 | Stefani | |
| 9,541,632 B2 | 1/2017 | Frank | |
| 9,552,564 B1 | 1/2017 | Martenis | |
| 9,589,262 B2 | 3/2017 | Graylin | |
| 9,589,405 B2 | 3/2017 | Cabouli | |
| 9,599,989 B1 | 3/2017 | Brown | |
| 9,697,479 B2 * | 7/2017 | Stamler ................. | G06Q 10/02 |
| 9,710,920 B2 | 7/2017 | Utsunomiya | |
| 9,749,831 B2 | 8/2017 | Lee | |
| 2002/0138625 A1 | 9/2002 | Bruner et al. | |
| 2003/0034390 A1 | 2/2003 | Linton et al. | |
| 2003/0048471 A1 | 3/2003 | Lundgren | |
| 2003/0111530 A1 | 6/2003 | Iki et al. | |
| 2003/0130769 A1 | 7/2003 | Farley et al. | |
| 2003/0146871 A1 | 8/2003 | Karr et al. | |
| 2003/0150922 A1 | 8/2003 | Hawes | |
| 2003/0220116 A1 | 11/2003 | Sagefalk et al. | |
| 2004/0030855 A1 | 2/2004 | Takeuchi et al. | |
| 2004/0039617 A1 | 2/2004 | Maycotte et al. | |
| 2004/0128193 A1 | 7/2004 | Brice et al. | |
| 2004/0249836 A1 | 12/2004 | Reynders et al. | |
| 2005/0004919 A1 | 1/2005 | Green et al. | |
| 2005/0033666 A1 | 2/2005 | Kurashige | |
| 2005/0071206 A1 | 3/2005 | Berge | |
| 2005/0228702 A1 | 10/2005 | Fairbanks et al. | |
| 2005/0258230 A1 | 11/2005 | Wiater | |
| 2005/0258247 A1 | 11/2005 | Hawes | |
| 2006/0004781 A1 | 1/2006 | Burgel et al. | |
| 2006/0053056 A1 | 3/2006 | Alspach-Goss et al. | |
| 2006/0085451 A1 | 4/2006 | Pal et al. | |
| 2006/0095434 A1 | 5/2006 | McCullough et al. | |
| 2006/0097046 A1 | 5/2006 | Baru Fassio et al. | |
| 2006/0173680 A1 | 8/2006 | Verhasselt et al. | |
| 2006/0238384 A1 | 10/2006 | Hess et al. | |
| 2006/0259456 A1 | 11/2006 | Falk et al. | |
| 2006/0277231 A1 | 12/2006 | Kral et al. | |
| 2006/0288021 A1 | 12/2006 | Kojima | |
| 2007/0055416 A1 | 3/2007 | Allen | |
| 2007/0072590 A1 | 3/2007 | Levitan | |
| 2007/0111725 A1 | 5/2007 | Kauffman et al. | |
| 2007/0133487 A1 | 6/2007 | Wang et al. | |
| 2007/0149216 A1 | 6/2007 | Misikangas | |
| 2007/0157078 A1 | 7/2007 | Anderson | |
| 2007/0198314 A1 | 8/2007 | Andrew et al. | |
| 2007/0203796 A1 | 8/2007 | Riggs | |
| 2007/0222595 A1 | 9/2007 | Motteram et al. | |
| 2007/0233617 A1 | 10/2007 | Gillespie | |
| 2007/0244766 A1 | 10/2007 | Goel | |
| 2007/0250356 A1 | 10/2007 | Douglas | |
| 2007/0265881 A1 | 11/2007 | El Eman et al. | |
| 2007/0273514 A1 | 11/2007 | Winand et al. | |
| 2008/0015926 A1 | 1/2008 | Marcken | |
| 2008/0027765 A1 | 1/2008 | Gunn et al. | |
| 2008/0027955 A1 | 1/2008 | May et al. | |
| 2008/0046298 A1 | 2/2008 | Ben-Yehuda et al. | |
| 2008/0065480 A1 | 3/2008 | Baker et al. | |
| 2008/0070517 A1 | 3/2008 | Brady et al. | |
| 2008/0091445 A1 | 4/2008 | Mihic | |
| 2008/0099552 A1 | 5/2008 | Grillion | |
| 2008/0140226 A1 | 6/2008 | Ganev | |
| 2008/0140434 A1 | 6/2008 | O'Brien | |
| 2008/0224823 A1 | 9/2008 | Lawson et al. | |
| 2008/0229228 A1 | 9/2008 | Cohen | |

(56) References Cited

U.S. PATENT DOCUMENTS

| | | |
|---|---|---|
| 2009/0010200 A1 | 1/2009 | Lauer et al. |
| 2009/0015398 A1 | 1/2009 | Bhogal et al. |
| 2009/0030781 A1 | 1/2009 | Mehta et al. |
| 2009/0033491 A1 | 2/2009 | Saunders |
| 2009/0063219 A1 | 3/2009 | Raufaste et al. |
| 2009/0070841 A1 | 3/2009 | Buga et al. |
| 2009/0112473 A1 | 4/2009 | Lu et al. |
| 2009/0164500 A1 | 6/2009 | Mathur et al. |
| 2009/0182590 A1 | 7/2009 | Ashby et al. |
| 2009/0187494 A1 | 7/2009 | Heath |
| 2009/0196201 A1 | 8/2009 | Ric |
| 2009/0256675 A1 | 10/2009 | Kerr |
| 2009/0259549 A1 | 10/2009 | Winand et al. |
| 2009/0266882 A1 | 10/2009 | Sajkowsky |
| 2009/0287513 A1 | 11/2009 | Anderson et al. |
| 2009/0307020 A1 | 12/2009 | Viale et al. |
| 2009/0310530 A1 | 12/2009 | Cerra, II et al. |
| 2009/0313601 A1 | 12/2009 | Baird et al. |
| 2010/0027461 A1 | 2/2010 | Bothorel |
| 2010/0030591 A1 | 2/2010 | Viard et al. |
| 2010/0065632 A1 | 3/2010 | Babcock et al. |
| 2010/0076795 A1 | 3/2010 | Steir et al. |
| 2010/0076826 A1 | 3/2010 | Bayne |
| 2010/0078475 A1 | 4/2010 | Lin et al. |
| 2010/0159871 A1 | 6/2010 | Tester |
| 2010/0190510 A1 | 7/2010 | Maranhas et al. |
| 2010/0191782 A1 | 7/2010 | Brzozowski |
| 2010/0198628 A1 | 8/2010 | Rayner |
| 2010/0205448 A1 | 8/2010 | Tarhan et al. |
| 2010/0245034 A1 | 9/2010 | D'Oliveiro et al. |
| 2010/0268656 A1 | 10/2010 | Teicher |
| 2010/0332358 A1 | 12/2010 | Owens |
| 2011/0018769 A1 | 1/2011 | Misikangas et al. |
| 2011/0028160 A1 | 2/2011 | Roeding et al. |
| 2011/0099294 A1* | 4/2011 | Kapur ............... H04L 67/32 709/246 |
| 2011/0119183 A1 | 5/2011 | Berman |
| 2011/0227737 A1 | 9/2011 | Kamins |
| 2012/0010912 A1* | 1/2012 | Lele ............... G06Q 10/00 705/5 |
| 2012/0035965 A1 | 2/2012 | Maguire et al. |
| 2012/0041313 A1 | 2/2012 | Tanaka |
| 2012/0042263 A1 | 2/2012 | Rapaport et al. |
| 2012/0042371 A1 | 2/2012 | Gur et al. |
| 2012/0075168 A1 | 3/2012 | Osterhout et al. |
| 2012/0101885 A1 | 4/2012 | Lee et al. |
| 2012/0123844 A1 | 5/2012 | Fano et al. |
| 2012/0129546 A1 | 5/2012 | Yang et al. |
| 2012/0200390 A1 | 8/2012 | Saravanan |
| 2012/0203578 A1 | 8/2012 | Baggett et al. |
| 2012/0284108 A1 | 11/2012 | Fontana et al. |
| 2013/0069985 A1 | 3/2013 | Wong et al. |
| 2013/0141313 A1 | 6/2013 | Zhou et al. |
| 2013/0211864 A1 | 8/2013 | Sanderson et al. |
| 2013/0234849 A1 | 9/2013 | Gupta et al. |
| 2013/0267255 A1 | 10/2013 | Liu et al. |
| 2013/0275913 A1* | 10/2013 | Moritz ............... G06F 3/0481 715/810 |
| 2013/0295966 A1 | 11/2013 | Dingler et al. |
| 2013/0297103 A1 | 11/2013 | Baker et al. |
| 2013/0325526 A1 | 12/2013 | Tyler |
| 2014/0006070 A1 | 1/2014 | Stamler |
| 2014/0006986 A1* | 1/2014 | Cappucio ............... G06F 3/0482 715/765 |
| 2014/0012640 A1 | 1/2014 | Roberts et al. |
| 2014/0035945 A1* | 2/2014 | Anglin ............... G06F 3/14 345/619 |
| 2014/0039717 A1 | 2/2014 | Henkel |
| 2014/0052482 A1 | 2/2014 | Le Marier et al. |
| 2014/0067244 A1 | 3/2014 | Baker et al. |
| 2014/0123315 A1 | 5/2014 | Baker et al. |
| 2014/0223043 A1 | 8/2014 | Dersy |
| 2015/0100869 A1* | 4/2015 | Sunshine ............... G06F 3/04842 715/205 |
| 2015/0199076 A1* | 7/2015 | Smus ............... G06F 17/30905 715/760 |
| 2016/0152350 A1 | 6/2016 | Puentes |
| 2016/0180255 A1 | 6/2016 | Goedemondt |
| 2017/0004444 A1 | 1/2017 | Krasko |
| 2017/0032263 A1 | 2/2017 | Yuan |

FOREIGN PATENT DOCUMENTS

| | | |
|---|---|---|
| DE | 102009020228 A1 | 11/2010 |
| EP | 1308864 A1 | 5/2003 |
| EP | 1318463 A1 | 6/2003 |
| EP | 0770546 B1 | 12/2003 |
| EP | 1454306 A2 | 9/2004 |
| EP | 1 610 094 A1 | 12/2005 |
| EP | 1679624 A2 | 7/2006 |
| EP | 1874001 B1 | 1/2008 |
| EP | 2088543 A1 | 8/2009 |
| EP | 2088569 A1 | 8/2009 |
| EP | 2222053 A1 | 8/2010 |
| EP | 2290600 A2 | 3/2011 |
| EP | 2362354 A2 | 8/2011 |
| EP | 2390845 A1 | 11/2011 |
| EP | 2474931 A1 | 7/2012 |
| EP | 2932902 B1 | 12/2016 |
| EP | 1872294 B1 | 11/2017 |
| GB | 2366945 A | 3/2002 |
| GB | 2408131 B | 3/2006 |
| GB | 2418511 A | 3/2006 |
| GB | 2469026 A | 10/2010 |
| GB | 2470897 A | 12/2010 |
| JP | 2003157984 A | 5/2003 |
| JP | 2005135199 A | 5/2005 |
| JP | 2006053724 A | 2/2006 |
| JP | 2008117340 A | 5/2008 |
| JP | 2008171181 A | 7/2008 |
| JP | 2009093603 A | 4/2009 |
| JP | 2017129981 A | 7/2017 |
| WO | 0073954 A2 | 12/2000 |
| WO | 200135269 A2 | 5/2001 |
| WO | 200135289 A1 | 5/2001 |
| WO | 03005237 A1 | 8/2001 |
| WO | 2001057323 A1 | 8/2001 |
| WO | 0215582 A1 | 2/2002 |
| WO | 2004045106 A1 | 5/2004 |
| WO | 2006010774 A1 | 2/2006 |
| WO | 2008055181 A2 | 5/2008 |
| WO | 2009002139 A1 | 12/2008 |
| WO | 2009021068 A1 | 2/2009 |
| WO | 2009058505 A1 | 5/2009 |
| WO | 2009091553 A1 | 7/2009 |
| WO | 2011057323 A1 | 5/2011 |
| WO | 2011088233 A1 | 7/2011 |
| WO | 2012105829 A2 | 8/2012 |
| WO | 2012106075 A1 | 8/2012 |
| WO | 2013079512 A1 | 6/2013 |

OTHER PUBLICATIONS

AIRCOM Server Administrator Guide, SITA Airline Telecommunications and Information Services, Feb. 19, 2013, pp. 1-280.

AIRCOM Server User Guide, SITA Airline Telecommunications and Information Services, Jan. 24, 2013, pp. 1-153.

Chen, et al., "A Survey of Context-Aware Mobile Computing Research", Department of Computer Science, Dartmouth College, pp. 1-16, Hanover, New Hampshire.

Examination Report of Malaysia Application No. 2013001405, received from the Intellectual Property Corporation of Malaysian dated Oct. 28, 2014.

Examination Report received in Malaysian Application No. PI 2013000936.

Glushko, et al., Bridging the "Front Stage" and "Back Stage" in Service System Design, Proceedings of the 41st Hawaii International Conference on System Sciences, 2008, pp. 1-10, California.

International Search Report and the Written Opinion mailed in International Application No. PCT/EP2013/052590 filed Aug. 2, 2013.

(56) References Cited

OTHER PUBLICATIONS

International Search Report and the Written Opinion mailed in International Application No. PCT/EP2013/057497 filed Oct. 4, 2013.
International Search Report and Written Opinion mailed in International Application No. PCT/EP2011/070551 filed Nov. 21, 2011.
International Search Report and Written Opinion mailed in International Application No. PCT/EP2014/062464 filed Jun. 13, 2014.
International Search Report and Written Opinion mailed in International Application No. PCT/EP2015/053319 filed Feb. 17, 2015.
International Search Report mailed in International Application No. PCT/EP2011/072286 filed on Sep. 12, 2011.
Kindervater, Revenue Management in the Airline Passenger Industry, 2007, pp. 1-24.
Kinneging, Machine Readable Travel Documents—Technical Report, PKI for Machine Readable Travel Documents Offering ICC Read-Only Access, PKI Task Force, International Civil Aviation Organization, Version 1.1, Oct. 1, 2004, pp. 1-58.
Kirby, Personal Services—In-flight connectivity poised to change the passenger experience for ever, http://www.flightglobal.com/news/articles/personal-services-in-flight-connectivity-poised-to-change-the-passenger-experience-for-332765/, Article dated Se.
Kitson, The Future of In-flight: Part Two—The Concierge Concept, http://ustwo.com/blog/the-future-of-in-flight-part-two-the-concierge-concept/, Article dated Apr. 2012.
Li, et al., XVM: A Bridge Between XML Data and Its Behavior, May 17-22, 2004, pp. 1-9, New York.
Machine Readable Travel Documents, Part 1, Machine Readable Passports—vol. 1, Passports with Machine Readable Data Stored in Optical Character Recognition Format, International Civil Aviation Organization, Sixth Edition, 2006, pp. 1-99.
Machine Readable Travel Documents, Part 1, Machine Readable Passports—vol. 2, Specifications for Electronically Enabled Passports with Biometric Identification Capability, International Civil Aviation Organization, Sixth Edition, 2006, pp. 1-131.
Machine Readable Travel Documents, Part 3, Machine Readable Official Travel Documents—vol. 1, MRtds with Machine Readable Data Stored in Optical Character Recognition Text, International Civil Aviation Organization, Third Edition, 2008, pp. 1-122.
Machine Readable Travel Documents, Part 3, Machine Readable Official Travel Documents—vol. 2, Specifications for Electronically Enabled MRtds with Biometric Identification Capability, International Civil Aviation Organization, Third Edition, 2008, page.
Madria, et al., An XML Schema Integration and Query Mechanism System, Science Direct, Data and Knowledge Engineering 65, 2008, pp. 266-303.
Marmasse, et al., Location-aware information delivery with comMotion, MIT Media Laboratory, HUC 2000 Proceedings, 2000, pp. 157-171.
McGuire, et al., The Future of Revenue Management, SAS Global Forum, 2009, pp. 1-5.
Robert Longley, "TSA's New ID, Boarding Pass Scanning System Draws Criticism", US Government, About.com, Aug. 2, 2012, 2 pages, retrieved online on Jul. 30, 2014, http://usgovinfo.about.com/od/defenseandsecurity/a/Tsa-Boarding-Pass-Scanning-System-Draws-.
Russian Search Report for 2013133853/08(050668) dated Feb. 20, 2015.
Schechner, Airlines Entertain Tablet Ideas—Rather Than Wiring Planes for In-Flight Movies, Some Hand Out iPads, http://online.wsj.com/articles/SB10000872396390443916104578020601759253578, Article dated Sep. 2012.
Schwinger, et al., Context-Awareness in Mobile Tourism Guides—A Comprehensive Survey, 2002, pp. 1-20.
Search Report and Examination Opinion mailed in International Application No. GB1421313.6.
Search Report and Written Opinion mailed in International Singapore Application No. 201306353-2, dated Apr. 11, 2014, by the Danish Patent and Trademark Office.
Search Report and Written Opinion of Singapore Application No. 201301980-7, dated Sep. 3, 2013.
Smith, et al., Yield Management at American Airlines, American Airline Decision Technologies, 1992, pp. 8-31.
Susan Stellin, "Automation Is Considered for Checking IDs in Airports", Business Day, The New York Times, Mar. 19, 2012, 3 pages, retrieved Sep. 4, 2014, http://www.nytimes.com/2012/03/20/business/tsa-is-considering-automating-id-checks.html.
Written Opinion mailed in Singapore Application No. 201301978-1, dated Oct. 15, 2013.
Xu, et al., A Model of Capacity Control with Overbooking for a Two-leg Airlines Network, IEEE 2008, pp. 1-5.
Dunkel, et al., Model-Driven Architecture for Mobile Applications, 2007, pp. 464-477, Hanover, Germany.
Johnston, et al., Multimodal Applications from Mobile to Kiosk, pp. 1-4.
Munoz, et al., Context-Aware Mobile Communication in Hospitals, IEEE Computer Society, 2003, pp. 38-46.
Caliendo, et al., Social Networks, Job Search Methods and Reservation Wages: Evidence for Germany, IZA, Sep. 2010, Germany.
International Search Report and Written Opinion mailed in International Application No. PCT/EP2014/055037 filed Mar. 13, 2014.
International Search Report and Written Opinion mailed in International Application PCT/EP2015/068682 dated Oct. 29, 2015.
International Search Report and Written Opinion mailed in Singapore Application No. 11201404575U dated Jun. 16, 2015.
Search Report and Written Opinion dated Apr. 2, 2014 in GB Application No. 1317659.9.

* cited by examiner

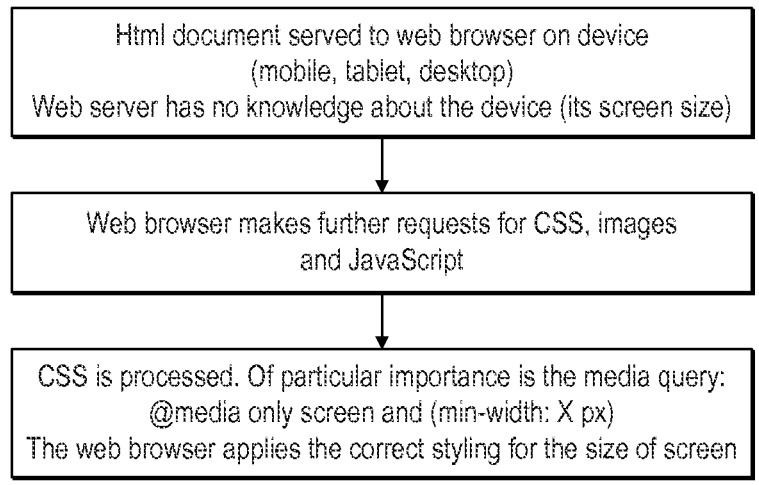

FIG. 3

```
Seat selection

Please select seats for your flight from London (LHR) to New York (JFK)

1.      1. seat A 1A available
        2. seat B 1B available
        3. seat C 1C available
        4. Row 1 1 aisle
        5. seat E 1E available
        6. seat F 1F occupied
        7. seat G 1G occupied
        8. seat H 1H available
        9. Row 1 1 aisle
        10. seat J 1J available
        11. seat K 1K available
        12. seat L 1L available
2.      1. seat A 2A available
        2. seat B 2B available
        3. seat C 2C available
        4. Row 2 2 aisle
        5. seat E 2E available
```

FIG. 4

1. seat A available  2. seat B available  2. seat C available seat A  seat B  seat C Seat A  Seat B  Seat C Seat selection Please select seats for your flight from London (LHR) to New York (JFK)

| seat A | seat B | seat C | Row 1 | seat E | s⊘F | seat G | seat H | Row 1 | seat J | seat K | seat L |
| seat A | seat B | seat C | Row 2 | seat E | seat F | seat G | seat H | Row 2 | seat J | seat K | seat L |

RESERVATION SYSTEM AND METHOD THEREFOR

CROSS-REFERENCE TO RELATED APPLICATIONS

This application is a Non-Provisional patent application and claims the benefit of and priority under 35 U.S.C. § 119 to U.S. Provisional Application Ser. No. 61/941,736, filed Feb. 19, 2014, entitled "Reservation System and Method Therefor," and to UK Patent Application Serial No. 1421313.6, filed Dec. 1, 2014, both of which are incorporated herein by reference as if set forth herein in their entireties.

FIELD OF THE INVENTION

This invention relates in general to a system for booking or reserving a particular product or service from a number of different products or services which might be available. More particularly, the invention relates to a reservation or booking system for seats on aeroplanes, in theatres, cinemas and stadiums and the like. The invention also relates to a server and device for displaying a map of different products distributed at different positions within the map which is accessible by the user device.

BACKGROUND OF THE INVENTION

In general, people using a mobile telephone or a tablet computer to book a seat have difficulty using online seatmaps. A seatmap may be thought of as an interactive online representation of the real world and might symbolise the seats in a cinema, theatre, stadium, or seats on an aeroplane or train.

Online seatmaps have existed for many years but they were not designed for mobile devices; they were designed for use with desktop computers, which, in general, have a large display, a keyboard and a mouse. Such a seatmap is shown in FIG. 1a of the drawings.

As will be appreciated, using a desktop computer equipped with large screen and mouse, it is very easy to select a seat by hovering over circle representing the seat with a mouse and clicking the red circle. The same webpage viewed on a mobile device is very difficult to use, as can be seen in the left hand drawing of FIG. 1b of the drawings. The user has to zoom in an enormous amount in order to select a seat. It is hard, using a finger rather than a mouse, to select the required seat rather than any of the others surrounding it, and this is illustrated in FIG. 1b. As can be seen in the right hand drawing of FIG. 1b, having zoomed in, the row-numbers are no longer visible. This is because the JavaScript is overlaying the header and this further reduces the available screen size.

Some service providers have attempted to overcome this by creating a separate mobile website. In such solutions, the website recognises that a mobile device is being used and switches the device to an entirely different website. This approach works but it is very expensive for the service provider to maintain multiple websites.

Other service providers offer a mobile application, which customers can download, install and then use to select seats and book tickets. Again, this works but it is expensive to maintain, difficult to support all mobile and tablet devices and it is off putting to customers who, rather than installing an application might visit a competitor's website instead.

SUMMARY OF THE INVENTION

The invention is defined in the appended claims to which reference should now be made. According to a first aspect of the present invention there is provided a reservation system for aeroplane seats comprising communication means for receiving, from a remote device, an availability request for a product or service sending, to the device, a first list element data representing a distribution of a plurality of different products or services within a map in response to receiving the request; and receiving, from the remote device, a reservation request for one of the plurality of different products or services. Preferably, the first list element data is ordered list element data, although this is in fact optional.

Embodiments of the invention seek to address the above problems by providing a single e-commerce server which is configured to support a responsive seat map website which is operable with any device, regardless of whether it is a desktop computer, a tablet or a mobile telephone. The website may operate without switching a user query to a different website which is specifically configured for the user device making the request.

This is particularly important for e-commerce websites, such as websites for booking or reserving seats, where the seat availability changes rapidly, and in real time.

Embodiments of the invention seek to provide an improved seatmap website which is accessible and easily usable, irrespective of the device being used, for example a screen reader or desktop PC. Embodiments of the invention also seek to provide a seatmap website which is operable without the use of JavaScript. Embodiments of the invention seek to provide a seatmap website which minimises the size and number data files which need to be downloaded, such as seat images in GIF, PNG, or JPEG format.

BRIEF DESCRIPTION OF THE DRAWINGS

An embodiment of the invention will now be described, by way of example only, and with reference to the accompanying drawings, in which:

FIG. 3 is a flow diagram showing the main steps performed by an embodiment of the invention;

FIG. 4 shows how a seatmap embodying the invention is rendered on a device such as a screen reader device for use by people with disabilities;

The following description is of a system for use in the aviation industry, but this is exemplary and other applications of the invention will also be discussed. For example, the system may be used in any environment a user wishes to select one service or product from another service or product, and where different products may be represented by different locations in a map. The invention also has particular application to the travel industry in general where a user may wish to book or reserve a particular seat prior to travel. Thus, embodiments of the invention find application in the travel industry in general (for example rail, air, coach and the like), but also in the ticketing industry, such as ticketing for theatre, cinema, and the like.

A seatmap is difficult to implement in html. Creating a representation of all the seats on an aircraft or the seats in a stadium is problematic when html does not easily lend itself to this sort of complex graphical display.

Figure 1A:
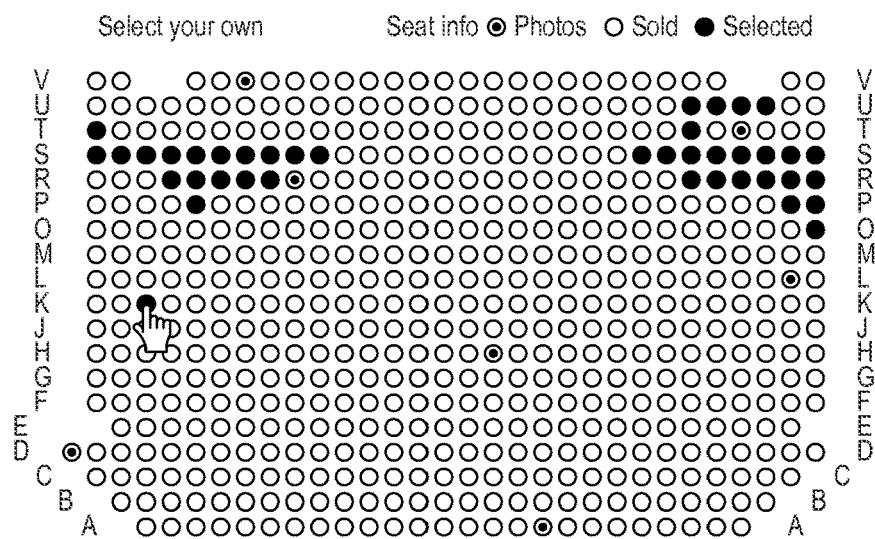
FIG. 1a shows a prior art seatmap for use with a desktop personal computer.
Figure 1B:
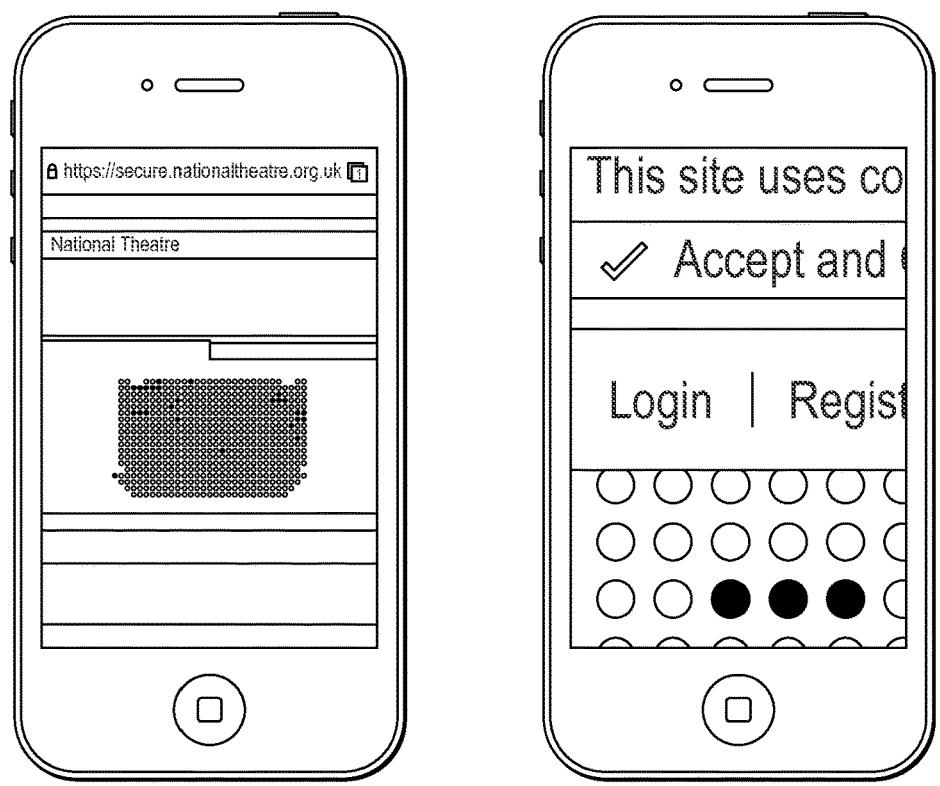
FIG. 1b shows how the seatmap of FIG. 1a is rendered on a mobile device.
Figure 1C:
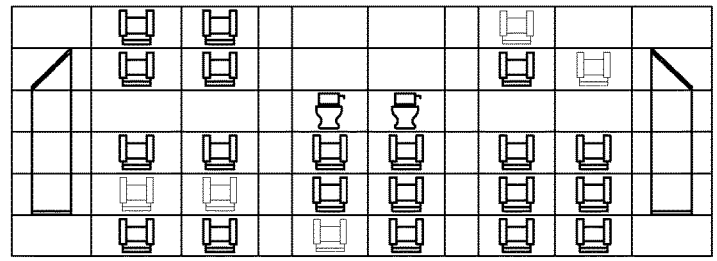
FIG. 1c shows a schematic representation of seatmap rendered using an html table.

Many seatmaps on the web today have been implemented using html tables. FIG. 1c of the drawings shows a standard seatmap included with SITA eCommerce.

Whilst this approach worked in the past, html tables and Responsive Web Design are not compatible. It is not possible to manipulate tables so that they are satisfactorily displayed on all devices. Further, code behind the seatmap shown in FIG. 1c is inefficient: it requires a lot of calculations and a large amount of html to implement.

It is also impossible for a screen reader, which might be used by a blind or visually impaired person, to make sense of the code behind the seatmap shown in FIG. 1c. As such, blind and visually impaired people would be unable to select a seat. Below, is part of the html for the seatmap shown in FIG. 1c.

```
<tr>
    <td class="rownumber">12</td>
    <td class="wall"> </td>
    <td class="airseat occ">
        <img id="S_12A" name="S_12A"
            src="/images/seats/standard_seaticon2.gif"
            border="0">
    </td>
    <td class="airseat unocc selectbl">
        <a     href="#"    onclick="SeatClick('S_12B',
'standard_selected_seaticon.gif',
            '/images/seats/standard_seaticon.gif',   this);return
    false"
            onmouseover="SwapSeatImage('S_12B',
'/images/seats/standard_seaticon2.gif')"
            onmouseout="SwapSeatImage('S_12B',
'/images/seats/standard_seaticon.gif')">
            <img id="S_12B" name="S_12B"
                src="/images/seats/standard_seaticon.gif"
                border="0">
        </a>
    </td>
    <td class="airseat occ">
        <img     id="S_12C"       name="S_12C"
src="/images/seats/standard_seaticon2.gif"
            border="0">
    </td>
    <td class="aisle aisle">
        <img src="/images/seats/empty_seaticon.gif" border="0">
    </td>
    <td class="airseat unocc selectbl">
        <a     href="#"    onclick="SeatClick('S_12D',
'standard_selected_seaticon.gif',
            '/images/seats/standard_seaticon.gif',   this);return
    false"
            onmouseover="SwapSeatImage('S_12D',
'/images/seats/standard_seaticon2.gif')"
            onmouseout="SwapSeatImage('S_12D',
'/images/seats/standard_seaticon.gif')">
            <img     id="S_12D"       name="S_12D"
src="/images/seats/standard_seaticon.gif"
                border="0">
        </a>
    </td>
```

It should be noted that this code only outputs 4 seats. Apart from the fact that there is a lot of code, there is very little for a screen reader to make sense of. The JavaScript is jumbled up with the html making it even more difficult to decode.

Figure 2:
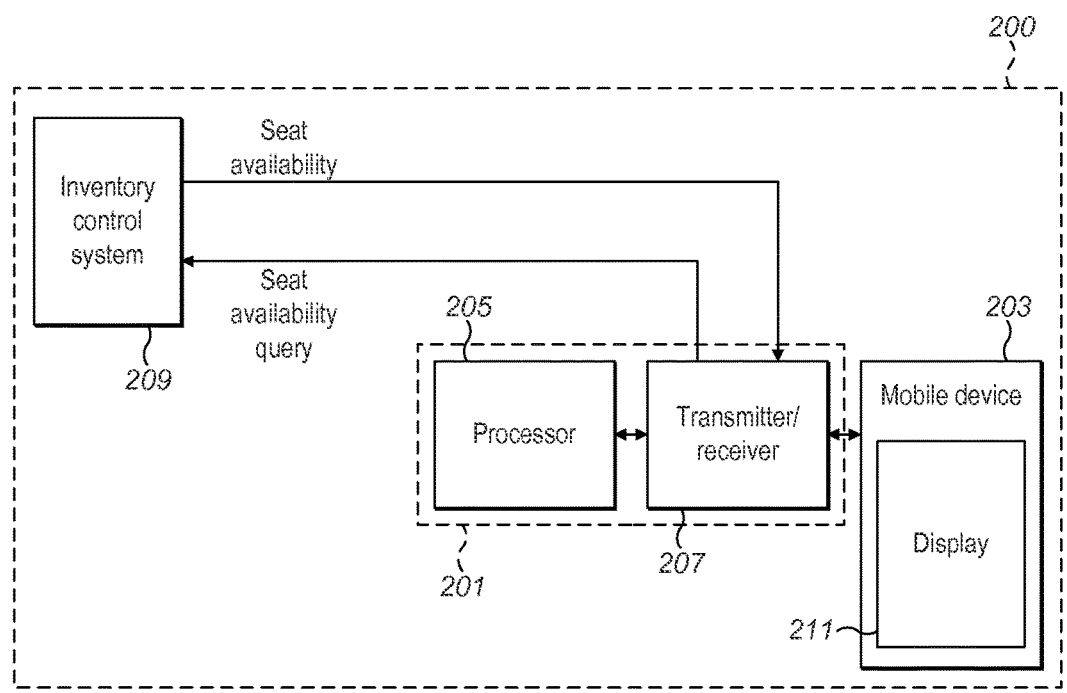
FIG. 2 shows the main functional components of a server embodying the invention as well as a remote user device embodying the invention which is used for accessing the system.

Referring now to FIG. 2 of the drawings, the main functional components of a system 200 embodying the invention will be described. The system may include 2 main functional components; a server 201 supporting a web page which is accessible, in principle, by any number of wired or wireless remote devices, referred to as a communication devices 203 comprising a display 211, via wired or wireless communication protocols which will be known to the skilled person. However, it will be appreciated that the invention may be embodied in solely the communication device 203, or solely in the server, or both.

The server may comprise a processor 205 and transmission/receiving means 207 for transmitting and receiving communications with a mobile device and possible with an inventory control system 209 which controls seat availability. Embodiments of the invention enable a server to support a responsive seatmap where one or more seats can be booked using one website that serves all devices. The seatmap may be configured to operate with or without Javascript on all modern web browsers.

Embodiments of the invention incorporate a responsive design approach so that the website is displayed on the communication device in a manner which facilitates user interaction with the displayed page, for example, by minimising the amount of resizing, panning and scrolling required, irrespective of the device displaying the webpage.

Many content-rich websites have been made responsive so that they work well with any sort of device regardless of whether it is a desktop computer, a tablet or a mobile phone. However, very few ecommerce websites have. Mobile applications which have to be downloaded and installed on a device are also costly and can be off-putting to customers who might not necessarily want to download and install an application, just to check a fare, book a ticket or reserve a seat.

Embodiments of the invention provide a responsive seatmap by using clean, semantic html (hypertext markup language) and css (cascading stylesheets). This code is more efficient and it adapts to the device being used, and will be described in detail below.

Below is a slimmed down version of the html used to generate the responsive seatmap according to embodiments of the invention:

```
<ol class="seatmap">
    <li class="row" id="r1">
        <ol class="seats">
            <li class="seat available" id="s1A">
                <a title="Select seat A in row 1" href="#s1a">
                    <span class="description">seat A</span>
                    <span class="desc">1A</span>
                    <span class="status">available</span>
                </a>
            </li>
```

Additional list items are generated to output all other seats in this row as well as other features such as the corridor, exits, wings, toilets and galley.

```
        </ol>
    </li>
    <li class="row" id="r2">
        ...
    </li>
</ol>
```

The following should be noted about the above html:
Lists are used to model the seat layout in html
  The seatmap is an ordered list
  A list element is created for each row of seats
  The list element has the html class "row" so that all rows can be styled
  Each list element has a unique ID (i.e. "r1") so that each row can be styled individually or accessed by JavaScript.
Inside each row another ordered list is output
  The internal ordered list contains a list element for each seat
  The list element has the html class "seat" so that all seats can be styled
  The status is added as an html class (e.g. "available"/ "occupied")
  Each list element has a unique ID (i.e. "s1a") so that each individual seat can be styled or accessed by JavaScript.
  A long description and a short description is output for each seat. The most appropriate is shown with the other being hidden by the CSS.

FIG. 4 of the drawings shows how the above html is rendered in a web browser, or is rendered by a screen reader, which might be used by a visually impaired user. This demonstrates that the seat display still works for people with disabilities who might be using a screen reader and are still able to select an available seat. It also demonstrates that seat selection is still available without JavaScript: users simply select one of the links to choose a seat.

However, embodiments of the invention may incorporate CSS, Cascading Stylesheet rules, so that the seatmap is responsive to the type of device requesting information on available seats, and displaying the seatmap.

A number of CSS rules make this possible.

The stylesheet takes a mobile-first approach. This means that the display is styled for mobile devices. The rules for wider displays (bigger screens) are enclosed in media queries. With this approach, many different blocks of CSS code, relating to various different browser window widths, is sent to each web browser. The web browser then applies the appropriate CSS given the current width of the browser window.

Media Queries

```
@media only screen and (min-width: 880px) {
    ...
}
```

Media Queries are used to implement specific CSS rules when the browser window is a certain width. 880px is used as an example above but media queries can be created for as many different widths as required. The CSS may use a Media Query to determine the width of the user's web browser. The rules may use Media Queries.

Media Queries are used by Cascading Style Sheets (CSS) to determine the width of the user's web browser window. The Style Sheet may contains one or more rules. For example, the a rule may determine the browser window size. If the browser window is determined to be greater than 900px but less than 1200px then user interface is formatted in a first manner. In a further example, if the browser window size is determined to be greater than 1200px but less than 2000px then the user interface is formatted in an alternative manner. The formatting style may be rendered as shown in accordance with FIGS. 8 to 14 of the drawings, and described in further detail below.

All the rules are sent to all web browsers—provided that the web browser understands CSS and has CSS enabled or switched on. When CSS disabled or switched off, the web browser does not request the CSS files.

With media queries, all the CSS is sent to the web browser. The browser then uses its own knowledge about the current width of the window, to decide which CSS to implement.

Seat Styling

To make a seatmap, we are faced with the problem of making of standard html mimic the layout of seats in an auditorium or aeroplane, for example.

This is implemented as follows.

Firstly, the html is created: as mentioned previously the html for a single seat is shown below.

```
<li class="seat available" id="s1A">
    <a title="Select seat A in row 1" href="#s1a">
        <span class="description">seat A</span>
        <span class="desc">1A</span>
        <span class="status">available</span>
    </a>
</li>
```

Embodiments of the invention use a list (LI) so that the displayed text makes sense to people who have the CSS disabled (such as those using a screen reader).

Inside the list, we use an anchor tag (A) so that users can click the seat they want to sit in. This works for all users, all devices and does not require JavaScript.

All the text is enclosed in span tags so that it can be styled later.

This user sees the following in his web browser: (two additional seats are shown)

seat A 1A available
seat B 1B available seat C 1C available

Clearly this looks nothing like a seat and so some styling is required.

Seat Row

In the real world, the seats are side by side and so we need to represent that on the page. We do this by floating each seat left. To make the seat responsive to all devices and screen widths, we set the seat width as a percentage rather than an absolute value. Rows of seats now use the full width of the display.

```
LI{
    float:left;
    white-space:nowrap;
    text-align:center;
}
LI.seat{
    margin-right:0.4%;
    width:8.5%;
}
```

Figures 5, 6, 7, 8, 9:
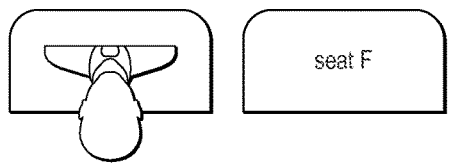
FIG. 5; shows how CSS is used to reposition seat links horizontally.
FIG. 6; shows how the rendered html is displayed on a device where the information included for screen readers or optional JavaScript popups is hidden.
FIG. 7 shows how the styled html is rendered on a device which shows seat A adjacent to seat B which, in turn is adjacent to seat C.
FIG. 8; shows how the styled html is rendered on a large display.
FIG. 9; shows how the styled html is rendered on a display, and how it can include a popup window can show more information about the requested seat and how the cursor changes to a representation of a person being dropped into the requested seat.

This code would be rendered as shown in FIG. 5 of the drawings. FIG. 5 shows how CSS is used to reposition seat links horizontally so that seats that would be side-by-side in the real world are side-by-side on the display. FIG. 5 also shows text included for people with disabilities.

Now we can hide the information included only for screen readers or optional JavaScript popups. We can also hide the bullet points/numbered list:

```
.status{
    display:none;
}
UL, OL{
    list-style-type: none;
}
```

This code would be rendered as shown in FIG. 6 of the drawings.

Seats that Look Like Seats

The seat links are now side-by-side but they still look very much like standard html links. The final step is to style the links and make them look more 'seat' like.

This is achieved by styling the anchor tag: removing the 'underline', adding a border, rounding the edges at the top and changing the background colour. The rounded corners (border-radius) mimic the rounded edge on a seat/cushion.

```
A {
    text-decoration: none;
    border: 1px solid #666;
    border-top-left-radius: 10px;
    border-top-right-radius: 10px;
    padding: 10%;
    margin-right:0.1%;
    margin-bottom:0.1%;
    color:#222;
    background-color:#aaa;
    white-space:nowrap;
    display:block;
}
```

This code is rendered as shown in FIG. 7 of the drawings.

Using the above rules, the code is rendered on a screen reader as shown in FIG. 4 of the drawings, and is rendered on a large display as shown in FIG. 8 of the drawings. On such a large, wide display the seatmap uses as much space as it needs and a richer interface is available.

Figures 10, 11, 12, 13:
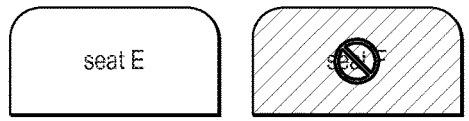
FIG. 10 shows how the styled html is rendered on a display, and how it can include a cursor to indicate when a seat is not available.
FIG. 11; shows how the styled html is rendered on a smaller display where seats adjust so that they fit to the available space.
FIG. 12 shows how the styled html is rendered on a smaller display by reducing the text when space is limited.
FIG. 13 shows how the styled html is rendered on a very small display by adjusting the seat size so that corresponds approximately to the font size.

As shown in FIG. 9 of the drawings, a popup window can show more information about the requested seat and it is possible to change the cursor so that it looks like a person is being dropped into the requested seat. As shown in FIG. 10 of the drawings, another cursor can be used to indicate when seats are not available.

Further, as shown in FIG. 11 of the drawings, on smaller displays, the seats adjust so that they always fit.

Figure 14:
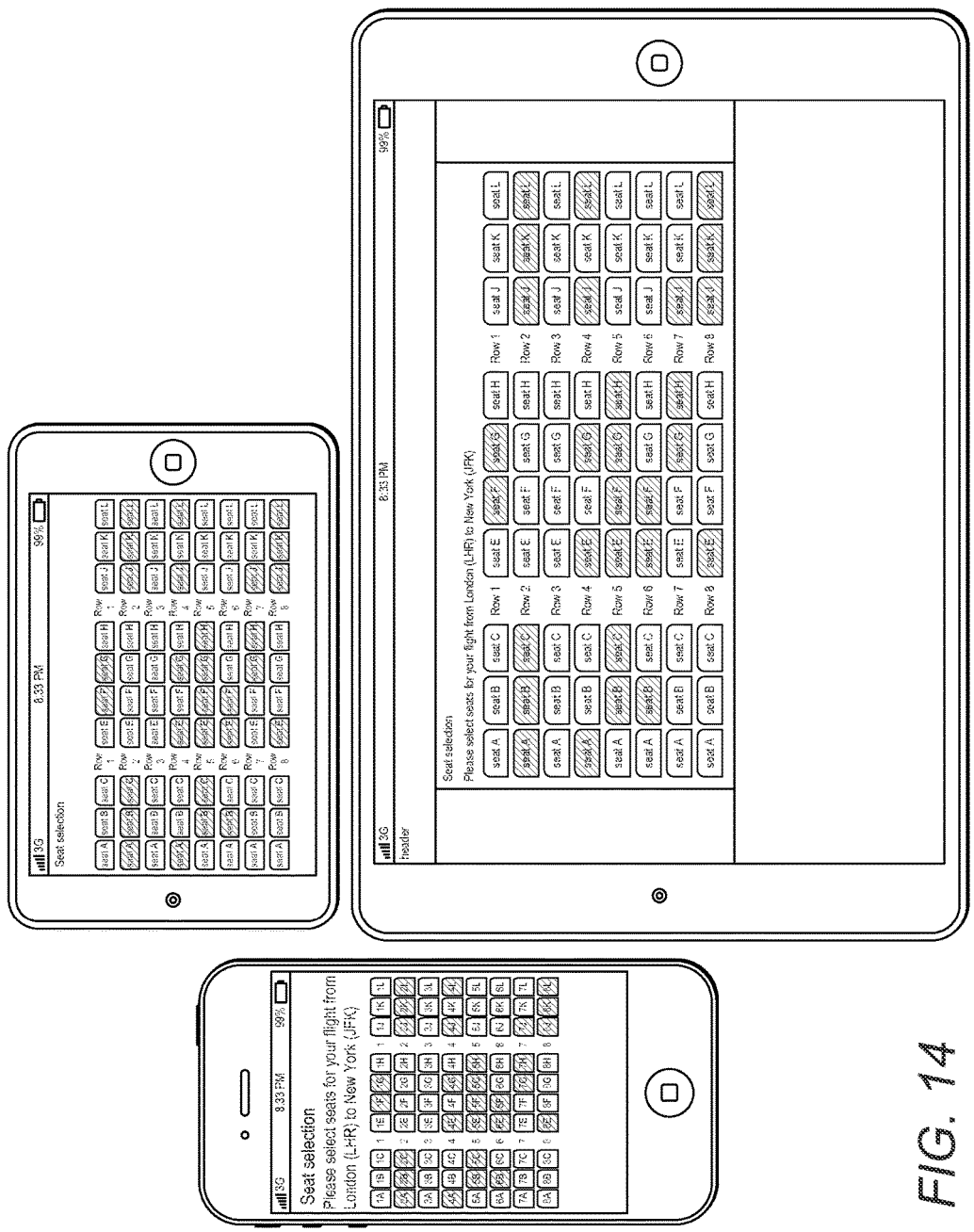
FIG. 14 shows how the styled html is rendered on three different devices having different display sizes.

FIG. 12 shows how the text is reduced when space is limited, while FIG. 14 shows how the seatmap is displayed on the smallest display.

Accordingly, embodiments of the invention provide a seatmap that:

works with all devices adapting to all screen widths is suitable for users with disabilities (using a screen reader)

requires the smallest possible download (for users with slow connections)

Without images or JavaScript, this seatmap, containing 80 seats, requires a download of just 26 kb. It is anticipated that some JavaScript would be required but this would not add significantly to the total. Each additional row of 10 seats uses just 3 kb of extra data.

Other seatmaps supply seats as images in GIF, PNG or JPEG format. Whilst this can create a more realistic seatmap, it adds to the number of downloads and the amount of data required.

An alternative to this design is to use SVG stacks. SVG (Scalable Vector Graphics) is a vector image format and can be used to create image files that are very small on disc. The images need to be reasonably simple and so a simple seat icon could be easily created and would use only a small number of kilobytes. Importantly, SVG files—being vector graphics—can be output at any size on the web page which is vital for a responsive seatmap that must work at all screen sizes. SVG stacks allow us to 'stack' several images in one file, which makes them quicker to download.

A further advantage of a responsive seatmap is cost. Providing just one website serving all devices is vastly cheaper than providing a separate site for mobile devices.

As will be appreciated by the person having ordinary skill in the art, a computer readable medium, containing computer readable instructions, may be provided, wherein the computer readable instructions, when executed, case a computer to undertake any method step or combination of method steps described herein.

The invention claimed is:

1. A reservation system comprising:

a communication means for:

receiving, from a remote device, an availability request for a product or service;

sending, to the remote device, at least a first ordered list element data representing a distribution of a plurality of different products or services within a seat map in response to receiving the request; and receiving, from the remote device, a reservation request for one of the plurality of different products or services;

wherein the communication means is further arranged to receive a styling request associated with the display of the products or services on a display and in particular wherein the communication means is arranged to send the styling data only if a styling request has been received;

wherein the communication means is further configured to send style sheet data for each ordered list element for rendering on a display, wherein the style sheet data comprises a plurality of different style data associated with different viewing area pixel sizes, and in particular wherein the style sheet data floats each product or service so that each row of the distribution of the plurality of different products or services within the seat map occupies a full display width of the display and wherein the style data sets the display width of each product or service as a percentage value of the display width; and wherein the communication means is further configured to send descriptor data associated with the product or service, wherein each product or service is associated with a plurality of descriptors for selection and formatting based on a determined viewing area pixel size.

2. The reservation system of claim 1, wherein the communication means is further arranged to send a unique identifier associated with the ordered list element data.

3. The system of claim 1, further comprising a processing means configured to associate each product or service with status element information indicative of the availability of each product or service, and in particular wherein the communication means is arranged to send the status element information to the remote device and wherein each status element is associated with the ordered list element.

4. The system of claim 3, wherein the processing means is configured to represent a distribution of seats within the seat map by associating the first ordered list element with a plurality of different seats distributed within the seat map and wherein the communication means is further arranged to send styling data associated with each ordered list and to send a media query data for determining a viewing area pixel size.

5. The system of claim 4, wherein the processing means is further configured to associate the first ordered list element data with a first row of products or services and in particular in which the processing means is further configured to associate a plurality of ordered list elements with a plurality of rows of products or services.

6. The system of claim 5, wherein the processing means is further configured to associate each list element with a unique identifier and wherein each product or service is associated with at least one descriptor of the product or service.

7. The system of claim 1, wherein the communication means is further configured to send style sheet data for each ordered list element for rendering on a display and in particular wherein the style sheet data hides bullet points or hides a numbered list.

8. The system of claim 1, wherein the communication means is further configured to send style sheet data for each ordered list element for rendering on a display and in particular wherein the style sheet data styles an anchor tag by removing an underline, including a border, rounding the edges and changing a background colour.

9. The system of claim 1, wherein the communication means is further configured to send style sheet data for each ordered list element for rendering the product or service as a representation of a seat within the seat map.

10. A portable reservation system comprising:
a remote reservation system; and
a communication means for sending an availability request for a product or service and for receiving from the remote reservation system a first ordered list element data associated with a plurality of different products or services and for sending a unique identifier associated with the list element data in response to receiving the request;

wherein the communication means is arranged to send, to the remote reservation system, a reservation request for one of the plurality of different products or services and a styling request associated with the display of the products or services on a display;

wherein the communication means is arranged to receive style sheet data for each ordered list element for rendering on a display wherein the style sheet data comprises a plurality of different style data associated with different viewing area pixel sizes and wherein the style sheet data floats each product or service so that each row of the distribution of the plurality of different products or services within a seat map occupies a full display width of the display and wherein the style data sets the display width of each product or service as a percentage value of the display width; and wherein the communication means is further arranged to receive descriptor data associated with the product or service, wherein each product or service is associated with a plurality of descriptors and wherein one of the descriptors is selected and formatted based on a determined viewing area pixel size.

11. The portable reservation system of claim 10, further comprising a processing means for determining a current viewing area pixel size and selecting a style based on the determined viewing area pixel size.

12. A reservation method comprising:
receiving, from a remote device, an availability request for a product or service;
sending, to the remote device, a first ordered list element data representing a distribution of a plurality of different products or services within a seat map in response to receiving the request; and
receiving, from the remote device, a reservation request for one of the plurality of different products or services;
receiving a styling request associated with the display of the products or services on a display and in particular further comprising sending the styling data only if a styling request has been received;
sending style sheet data for each ordered list element for rendering on a display, wherein the style sheet data comprises a plurality of different style data associated with different viewing area pixel sizes, and in particular wherein the style sheet data floats each product or service so that each row of the distribution of the plurality of different products or services within the seat map occupies a full display width of the display and wherein the style data sets the display width of each product or service as a percentage value of the display width; and
sending descriptor data associated with the product or service, wherein each product or service is associated with a plurality of descriptors for selection and formatting based on a determined viewing area pixel size.

13. The reservation method of claim 12, further comprising sending a unique identifier associated with the ordered list element data.

14. The method of claim 12, further comprising associating each product or service with a status element information indicative of the availability of each product or service and in particular further comprising sending the status element information to the remote device, wherein each status element is associated with a list element.

15. The method of claim 12, further comprising representing a distribution of seats within the seat map by associating the first ordered list element with a plurality of different seats distributed within the seat map and further comprising sending styling data associated with each ordered list and to send a media query data for determining a viewing area pixel size.

16. The method of claim 12, further comprising associating the first ordered list element data with a row of products or services and in particular further comprising associating a plurality of ordered list elements with a plurality of rows of products or services.

17. The method of claim 12, further comprising associating a list element with each product or service associated with each ordered list element, wherein each list element comprises a class indicative of the availability status of the product or service and in particular in which each list element comprises a unique identifier.

18. The method of claim 12, further comprising associating each list element with a unique identifier, wherein each product or service is associated with at least one descriptor of the product or service.

19. The method of claim 12, further comprising sending style sheet data for each ordered list element for rendering on a display and in particular wherein the style sheet data hides bullet points or hides a numbered list.

20. The method of claim 12, further comprising sending style sheet data for each ordered list element for rendering on a display and in particular wherein the style sheet data styles an anchor tag by removing an underline, including a border, rounding the edges and changing a background colour.

21. The method of claim 12, further comprising sending style sheet data for each ordered list element for rendering the product or service as a representation of a seat within the seat map.

22. A portable reservation method comprising:

sending, using a communication means, an availability request for a product or service and for receiving from a remote reservation system, a first ordered list element data associated with a plurality of different products or services and for sending a unique identifier associated with the list element data in response to receiving the request; and sending, to the remote reservation system, a reservation request for one of the plurality of different products or services and a styling request associated with the display of the products or services on a display;

receiving, at the communication means, style sheet data for each ordered list element for rendering on a display wherein the style sheet data comprises a plurality of different style data associated with a plurality of different viewing area pixel sizes and wherein the style sheet data causes each product or service to float so that each row of the distribution of the plurality of different products or services within a seat map occupies a full display width of the display and wherein the style data sets the display width of each product or service as a percentage value of the display width; and receiving, at the communication means, descriptor data associated with the product or service, wherein each product or service is associated with a plurality of descriptors and wherein one of the descriptors is selected and formatted based on a determined viewing area pixel size.

23. The method of claim 22, further comprising determining a current viewing area pixel size of the plurality of different viewing area pixel sizes and selecting a style based on the determined viewing area pixel size.

\* \* \* \* \*